(12) United States Patent
Chen et al.

(10) Patent No.: US 11,752,982 B2
(45) Date of Patent: Sep. 12, 2023

(54) SYSTEM AND METHOD FOR AUTOMATED CLEANING

(71) Applicant: Beijing Tusen Weilai Technology Co., Ltd., Beijing (CN)

(72) Inventors: Chao Chen, Beijing (CN); Jie Sun, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/654,215

(22) Filed: Mar. 9, 2022

(65) Prior Publication Data

US 2022/0194328 A1    Jun. 23, 2022

Related U.S. Application Data

(62) Division of application No. 16/194,048, filed on Nov. 16, 2018, now Pat. No. 11,292,437.

(30) Foreign Application Priority Data

Nov. 16, 2017   (CN) .......................... 201711134100.3

(51) Int. Cl.
  *B60S 1/66*   (2006.01)
  *B60R 11/04*  (2006.01)
  *B60Q 1/00*   (2006.01)
  *B60S 1/56*   (2006.01)
  *B60S 1/08*   (2006.01)

(52) U.S. Cl.
  CPC .............. *B60S 1/66* (2013.01); *B60Q 1/0023* (2013.01); *B60R 11/04* (2013.01); *B60S 1/56* (2013.01); *B60S 1/0822* (2013.01); *B60S 1/0844* (2013.01); *B60S 1/566* (2013.01)

(58) Field of Classification Search
  None
  See application file for complete search history.

(56) References Cited

U.S. PATENT DOCUMENTS 6,975,923 B2   12/2005   Spriggs
7,742,841 B2    6/2010   Sakai et al.
(Continued)

FOREIGN PATENT DOCUMENTS

CN   103043035 A   4/2013
CN   103533231 A   1/2014
(Continued)

*Primary Examiner* — Cristi J Tate-Sims
(74) *Attorney, Agent, or Firm* — Perkins Coie LLP

(57) ABSTRACT

The present disclosure provides automatic cleaning system and method. The automatic cleaning system includes a control unit, a Micro Control Unit (MCU), a cleaning device and a sensor device. The control unit is configured to determine a cleaning type for cleaning a protective cover of a camera based on an image captured by the camera and the measured temperature and humidity on the outer surface of the protective cover. The control unit is also configured to generate a cleaning instruction based on the cleaning type. The control unit is also configured to send the instruction to the MCU. The MCU is configured to control the cleaning device to clean the protective cover of the camera in accordance with the cleaning instruction in response to receiving the instruction sent from the control unit.

20 Claims, 5 Drawing Sheets

(56) References Cited

U.S. PATENT DOCUMENTS

| | | |
|---|---|---|
| 8,346,480 B2 | 1/2013 | Trepagnier et al. |
| 8,706,394 B2 | 4/2014 | Trepagnier et al. |
| 8,718,861 B1 | 5/2014 | Montemerlo et al. |
| 8,983,708 B2 | 3/2015 | Choe et al. |
| 9,088,744 B2 | 7/2015 | Grauer et al. |
| 9,214,084 B2 | 12/2015 | Grauer et al. |
| 9,219,873 B2 | 12/2015 | Grauer et al. |
| 9,282,144 B2 | 3/2016 | Tebay et al. |
| 9,317,033 B2 | 4/2016 | Ibanez-Guzman et al. |
| 9,347,779 B1 | 5/2016 | Lynch |
| 9,418,549 B2 | 8/2016 | Kang et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,690,290 B2 | 6/2017 | Prokhorov |
| 9,701,023 B2 | 7/2017 | Zhang et al. |
| 9,712,754 B2 | 7/2017 | Grauer et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,739,609 B1 | 8/2017 | Lewis |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 2012/0117745 A1* | 5/2012 | Hattori ............... B60S 1/54 134/198 |
| 2012/0243093 A1* | 9/2012 | Tonar ............. H04N 5/22521 359/507 |
| 2013/0092758 A1* | 4/2013 | Tanaka ................ B60S 1/52 239/284.1 |
| 2016/0334230 A1 | 11/2016 | Ross et al. |
| 2017/0129418 A1 | 5/2017 | Koshiba |

FOREIGN PATENT DOCUMENTS

| | | |
|---|---|---|
| CN | 105905075 A | 8/2016 |
| CN | 106657716 A | 5/2017 |
| CN | 107333048 A | 11/2017 |
| JP | 2001171491 A | 6/2001 |

\* cited by examiner

SYSTEM AND METHOD FOR AUTOMATED CLEANING

This application is a divisional of and claims priority to and the benefits of U.S. patent application Ser. No. 16/194,048, entitled, "SYSTEM AND METHOD FOR AUTOMATED CLEANING" filed Nov. 16, 2018, which claims priority to and the benefits of Chinese Patent Application No. 201711134100.3, filed Nov. 16, 2017 of the same title and content. The disclosures of the afore mentioned patent applications are hereby incorporated by reference as part of the disclosure of this patent document.

DESCRIPTION

Technical Field

This disclosure relates to automatic driving technology. More specifically, to an automatic cleaning system and an automatic cleaning method.

Background

There are more and more applications of vehicle-mounted sensors in the present day. Applications of vehicle-mounted cameras have especially become increasingly popular, which provides users with convenience. However, there exist certain situations that can hinder camera abilities. A camera is an optical sensor. When the protective cover of a lens becomes dirty, data collected may be damaged or even unusable. Since a vehicle is typically driven in an outdoor environment, the protective cover of a vehicle-mounted camera may be easily dirtied, resulting in limited visibility. For example, dusts or small flying insects may stick onto the protective covers, and in rainy days, raindrops on the protective cover may also result in partially blocked images or light refractions from raindrops may result in image distortions. This might have a significant impact on the sensor effect or even result in sensor failure, posing a threat to the safety of automatic driving. In a low temperature environment in winter, the outer surface of the wind-proof protective cover is prone to clinging snow, ice or frost, all of which cannot be effectively removed using traditional methods and generally needs to be removed manually.

SUMMARY

In one aspect, an automatic cleaning system is provided. The automatic cleaning system includes a control unit, a Micro Control Unit (MCU), a cleaning device and a sensor device.

The control unit is configured to determine a cleaning type for cleaning a protective cover of a camera based on the image captured by the camera and the temperature and humidity on the outer surface of the protective cover measured by the sensor device. The control unit is also configured to generate a cleaning instruction based on the cleaning type. The control unit is also configured to send the instruction to the MCU.

The MCU is configured to control the cleaning device to clean the protective cover of the camera in accordance with the cleaning instruction in response to receiving the instruction sent from the control unit.

In another aspect, an automatic cleaning method is provided. The automatic cleaning method involves determining a cleaning type for cleaning a protective cover of a camera based on an image captured by a camera and a temperature and a humidity on the outer surface of the protective cover. The method also involves generating a cleaning instruction based on the cleaning type. The method also involves cleaning the protective cover of the camera in accordance with the cleaning instruction.

These as well as other aspects, advantages, and alternatives, will become apparent to those of ordinary skill in the art by reading the following detailed description, with reference where appropriate to the accompanying figures.

BRIEF DESCRIPTION OF THE DRAWINGS

The figures are provided to facilitate further understanding of the present disclosure. The figures constitute a portion of the description and can be used in combination with content of this disclosure to interpret, rather than limiting, the disclosure. In the figures.

DETAILED DESCRIPTION OF THE EMBODIMENTS

Figure 1:
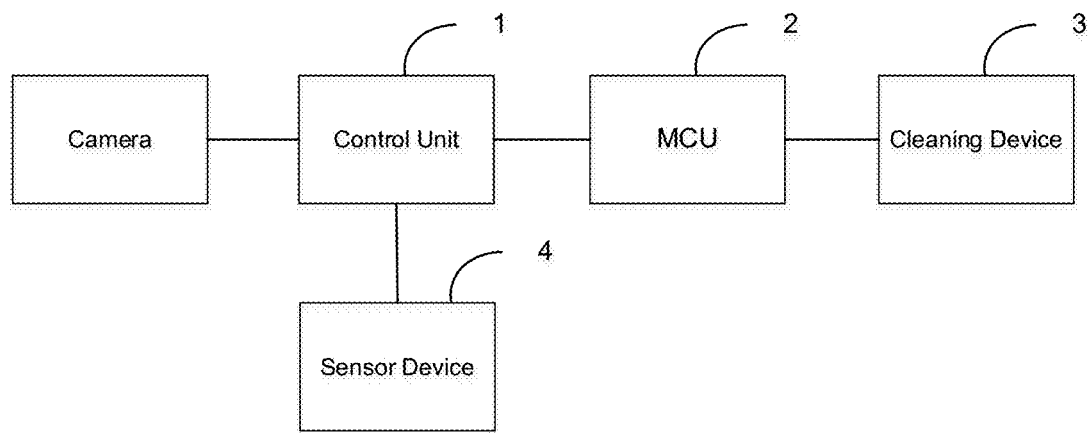
FIG. 1 is a first schematic diagram showing a structure of an automatic cleaning system according to an embodiment of the present disclosure.

In the following, the solutions according the present disclosure will be described clearly and completely with reference to the figures, such that the solutions can be better understood by those skilled in the art. Of course, the embodiments described below are only some, rather than all, of the embodiments of the present disclosure. All other embodiments that can be obtained by those skilled in the art based on the content described in the present disclosure without any inventive efforts are to be encompassed by the scope of the present disclosure.

Embodiment 1

According to Embodiment 1 of the present disclosure, an automatic cleaning system for automatically cleaning a protective cover of a camera is provided. In particular, the automatic cleaning system may include a control unit, a Micro Control Unit (MCU), a cleaning device and a sensor device.

The control unit may be configured to determine a cleaning type for cleaning the protective cover of the camera based on an image captured by the camera and a temperature and a humidity on an outer surface of the protective cover of the camera as measured by the sensor device, generate a cleaning instruction based on the cleaning type and send the cleaning instruction to the MCU.

The MCU may be configured to control the cleaning device to clean the protective cover of the camera in accordance with the cleaning instruction in response to receiving the cleaning instruction sent from the control unit.

In Embodiment 1 of the present disclosure, the control unit may be directly connected to the sensor device and may obtain the temperature and the humidity on the outer surface of the protective cover of the camera from the sensor device. Alternatively, in an embodiment of the present disclosure, the MCU may be connected to the sensor device and may obtain the temperature and the humidity on the outer surface of the protective cover of the camera from the sensor device and may send the temperature and the humidity on the outer surface of the protective cover of the camera as obtained to the control unit.

Of course, some extensions to the embodiment of the present disclosure can be made by those skilled in the art. For example, the functions of the control unit and MCU in the embodiment of the present disclosure may be achieved by one controller. For example, the controller may be connected to the camera, the sensor device and the cleaning device. The controller may perform functions including that of determining a cleaning type for cleaning the protective cover of the camera based on an image captured by the camera and a temperature and a humidity on an outer surface of the protective cover of the camera as measured by the sensor device, generating a cleaning instruction based on the cleaning type and controlling the cleaning device to clean the protective cover of the camera in accordance with the cleaning instruction.

In the embodiment of the present disclosure, the sensor device may include a temperature sensor and a humidity sensor. Alternatively, the sensor device may be one hardware device having a temperature measuring function and a humidity measuring function. The embodiment of the present disclosure is not limited to any of these. The sensor device may be provided near the protective cover of the camera, e.g., on a housing of the camera, or may be provided at a position close to the camera on a frame of a vehicle where the camera is installed.

Two examples will be described in the following, such that the solution of the present disclosure can be understood by those skilled in the art.

Example 1

As shown in FIG. 1, which shows an exemplary structure of an automatic cleaning system according to Embodiment 1, the automatic cleaning system includes a control unit 1, an MCU 2, a cleaning device 3 and a sensor device 4. The control unit 1 is connected to a camera, the MCU 2 and the sensor device 4. The MCU 2 is connected to the control unit 1 and the cleaning device 3.

The control unit 1 may be configured to receive from the camera an image captured by the camera and from the sensor device 4 a temperature and a humidity on an outer surface of a protective cover of the camera as measured by the sensor device 4; determine a cleaning type for cleaning the protective cover of the camera based on the image captured by the camera and the temperature and the humidity on the outer surface of the protective cover of the camera as measured by the sensor device; generate a cleaning instruction based on the cleaning type and send the cleaning instruction to the MCU.

The MCU 2 may be configured to control the cleaning device 3 to clean the protective cover of the camera in accordance with the cleaning instruction in response to receiving the cleaning instruction sent from the control unit 1.

Example 2

Figure 2:
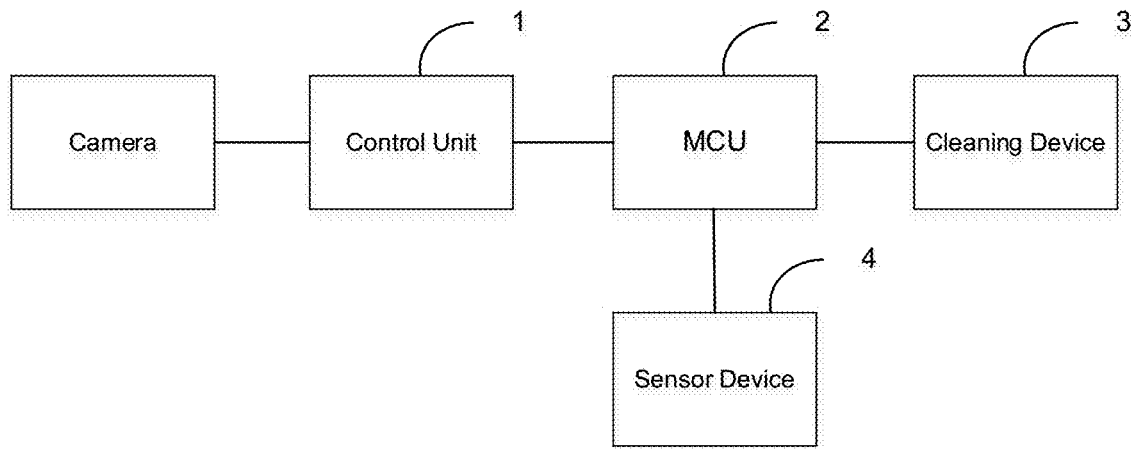
FIG. 2 is a second schematic diagram showing a structure of an automatic cleaning system according to an embodiment of the present disclosure.

As shown in FIG. 2, which shows another exemplary structure of an automatic cleaning system according to Embodiment 1, the automatic cleaning system includes a control unit 1, an MCU 2, a cleaning device 3 and a sensor device 4. The control unit 1 is connected to a camera and the MCU 2. The MCU 2 is connected to the control unit 1, the cleaning device 3 and the sensor device 4.

The control unit 1 may be configured to receive from the camera an image captured by the camera and from the MCU 2 a temperature and a humidity on an outer surface of a protective cover of the camera as measured by the sensor device; determine a cleaning type for cleaning the protective cover of the camera based on the image captured by the camera and the temperature and the humidity on the outer surface of the protective cover of the camera as measured by the sensor device; generate a cleaning instruction based on the cleaning type and send the cleaning instruction to the MCU 2.

The MCU 2 may be configured to receive from the sensor device 4 the temperature and the humidity on the outer surface of the protective cover of the camera as measured by the sensor device 4; send the temperature and the humidity on the outer surface of the protective cover of the camera to the control unit 1; and control the cleaning device 3 to clean the protective cover of the camera in accordance with the cleaning instruction in response to receiving the cleaning instruction sent from the control unit 1.

In some examples of Embodiment 1 of the present disclosure, the control unit 1 may generate the cleaning instruction based on the cleaning type in the following manner. As a non-limiting example, a configuration table may be provided in the control unit 1 in advance and a correspondence between cleaning types and cleaning instructions may be set in the configuration table. After determining the cleaning type for cleaning the protective cover of the camera, the control unit 1 may determine the cleaning instruction corresponding to the cleaning type based on the correspondence.

In some examples of Embodiment 1 of the present disclosure, the control unit 1 may determine the cleaning type for cleaning the protective cover of the camera based on the image captured by the camera and the temperature and the humidity on the outer surface of the protective cover of the camera as measured by the sensor device 4 by performing the following steps A1~A3.

At step A1, determining whether there is an obstruction outside the protective cover of the camera based on the image captured by the camera. If so, the operation proceeds with step A2; otherwise it proceeds with step A1.

At step A2, determining a type of the obstruction.

At step A3, determining the cleaning type for cleaning the protective cover of the camera based on the type of the obstruction and the temperature and the humidity on the outer surface of the protective cover of the camera.

In some examples of Embodiment 1 of the present disclosure, an abnormality detection model may be provided in the control unit 1 in advance. The image captured by the camera may be inputted to the abnormality detection model to obtain characteristic information corresponding to the image. It may be determined whether there is an obstruction on the outer surface of the protective cover of the camera based on the characteristic information corresponding to the image.

For example, a first set of images may be provided in advance. The first set of images includes normal images which are captured by the camera when the outer surface of the protective cover is not obstructed or contaminated and damaged images which are captured by the same camera when the outer surface of the protective cover is suffering from various types of obstructions or contaminations. The abnormality detection model may be obtained by iteratively training a neural network based on the first set of images. The abnormality detection model may be trained using any existing model training scheme and details thereof will be omitted here.

In some examples of Embodiment 1 of the present disclosure, a semantic segmentation model may be provided in the control unit 1 in advance. When the abnormality detection model determines that there is an obstruction outside the protective cover of the camera based on the image, the image may be inputted to the semantic segmentation model to determine the type of the obstruction.

For example, a second set of images may be provided in advance. The second set of images includes images of various types of obstructions, including at least images of frozen solids, images of non-frozen solids, images of viscous liquids and images of non-viscous liquids. The semantic segmentation model may be obtained by iteratively training a neural network based on the second set of images. The semantic segmentation model may be trained using any existing model training scheme and details thereof will be omitted here.

In some examples, the above step A3 may include: determining, when the type of the obstruction is solid substance, whether the temperature on the outer surface of the protective cover of the camera is lower than a predetermined temperature threshold (which may be set flexibly according to the actual situation, e.g., 5° or 0°), and if so, determining that the cleaning type is frozen solid, or otherwise determining that the cleaning type is non-frozen solid; or determining, when the type of the obstruction is liquid substance, whether the humidity on the outer surface of the protective cover of the camera is higher than a humidity threshold (which may be set flexibly according to the actual situation, e.g., 80%), and if so, determining that the cleaning type is non-viscous liquid, or otherwise determining that the cleaning type is viscous liquid.

Accordingly, the control unit 1 may generate the cleaning instruction based on the cleaning type as follows.

When the cleaning type is frozen solid, a first instruction including heating information and air blowing information may be generated.

When the cleaning type is non-frozen solid, a second instruction including air blowing information may be generated.

When the cleaning type is non-viscous liquid, a third instruction including wiper activating information may be generated.

When the cleaning type is viscous liquid, a fourth instruction including water spraying information and wiper activating information may be generated.

In some examples of Embodiment 1 of the present disclosure, the cleaning device 3 may include a wiper, an air blowing unit and a water spraying unit. The MCU 2 may control the cleaning device 3 to clean the protective cover of the camera in accordance with the cleaning instruction as follows.

In response to receiving the first instruction, the MCU 2 may control a heating plate installed inside the protective cover of the camera to generate heat for a predetermined time length based on the heating information, and then control the air blowing unit in the cleaning device 3 to blow air towards the outer surface of the protective cover of the camera based on the air blowing information.

In response to receiving the second instruction, the MCU 2 may control the air blowing unit 3 in the cleaning device to blow air towards the outer surface of the protective cover of the camera based on the air blowing information.

In response to receiving the third instruction, the MCU 2 may activate the wiper in the cleaning device 3 to wash the outer surface of the protective cover of the camera based on the wiper activating information.

In response to receiving the fourth instruction, the MCU 2 may control the water spraying unit in the cleaning device 3 to spray water towards the outer surface of the protective cover of the camera based on the water spraying information, and activate the wiper in the cleaning device to wash the outer surface of the protective cover of the camera based on the wiper activating information.

In the embodiment of the present disclosure, the MCU 2 may activate the wiper in the cleaning device to wash the outer surface of the protective cover of the camera based on the wiper activating information by: activating a wiper controller in the cleaning device based on the wiper activating information, such that the wiper controller may control the wiper to move so as to wash the outer surface of the protective cover of the camera.

In some examples of Embodiment 1 of the present disclosure, the heating plate provided inside the protective cover of the camera may be a silicone electrical heating film, an electrical heating wire or an electrical heating rod. As the silicone electrical heating film is flexible and can be fully attached to the inner side of the protective cover of the camera so as to achieve a good heating effect, in the embodiment of the present disclosure, the heating plate provided inside the protective cover of the camera may be a silicone electrical heating film. The silicone electrical heating film may have a thickness of 1.50 mm and its internal heating element may be a nickel chromium wire or metal foil. In an embodiment of the present disclosure, the heating plate may be attached to a position on an inner wall of the protective cover of the camera that does not obstruct the camera lens.

In some examples of Embodiment 1 of the present disclosure, the structure of the air blowing unit and the water spraying unit in the cleaning device 3 may include, but not limited to, the following two structures.

Figure 3:
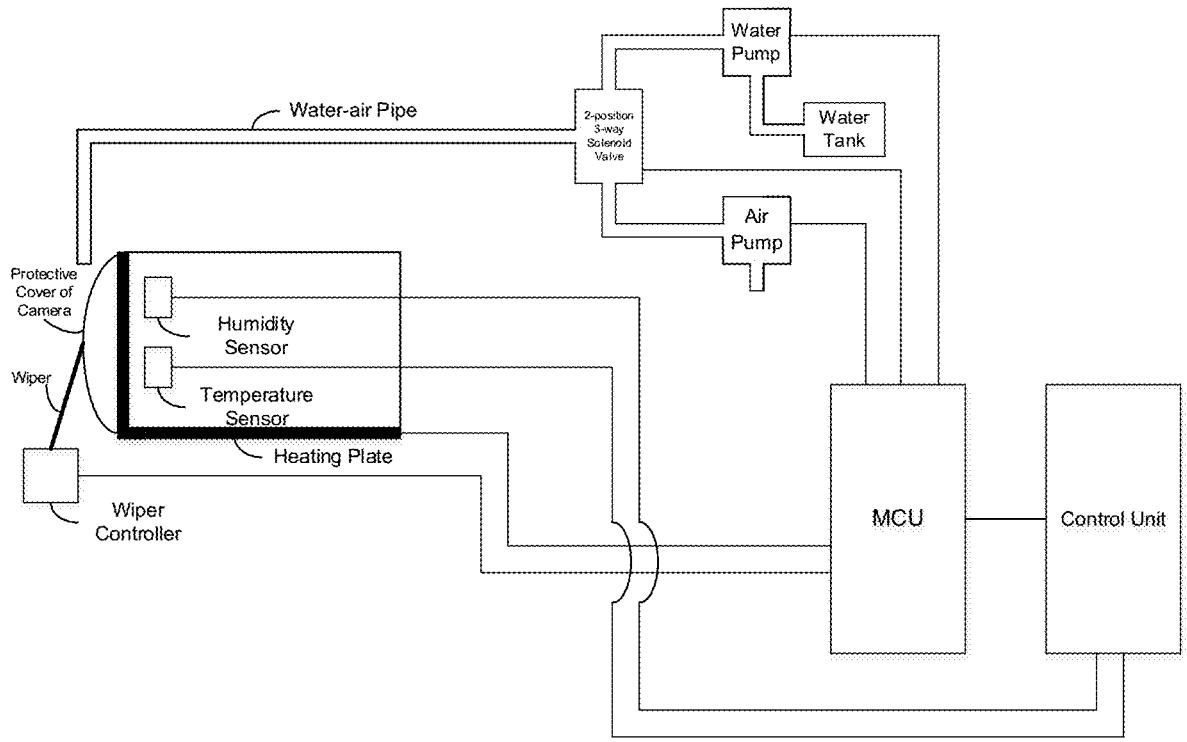
FIG. 3 is a third schematic diagram showing a structure of an automatic cleaning system according to an embodiment of the present disclosure.
Figure 4:
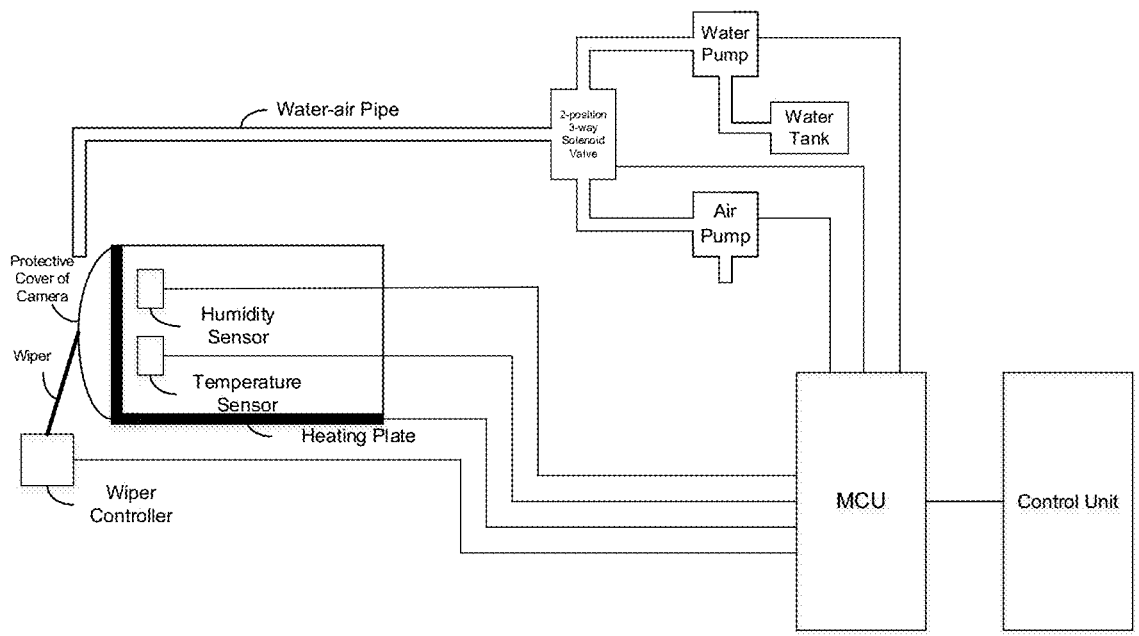
FIG. 4 is a fourth schematic diagram showing a structure of an automatic cleaning system according to an embodiment of the present disclosure.

Structure 1: The air blowing unit may include an air pump and the water spraying unit includes a water pump and a water tank. An air outlet of the air pump and a water outlet of the water pump may be connected to one single water-air pipe through a two-position three-way solenoid valve. A nozzle of the water-air pipe may be aimed at the outer side of the protective cover of the camera, as shown in FIGS. 3 and 4.

With Structure 1, the MCU 2 may control the air blowing unit in the cleaning device 3 to blow air towards the outer surface of the protective cover of the camera based on the air blowing information by: controlling the two-position three-way solenoid valve to be turned on (or off), so as to connect the air outlet of the air pump and the water-air pipe, and controlling the air pump to blow air towards the outer surface of the protective cover of the camera via the water-air pipe. The MCU 2 may control the water spraying unit in the cleaning device 3 to spray water towards the surface of the protective cover of the camera based on the water spraying information by: controlling the two-position three-way solenoid valve to be turned off (or on), so as to connect the water outlet of the water pump and the water-air pipe, and controlling the water pump to pump water from the water tank and spray water towards the outer surface of the protective cover of the camera via the water-air pipe.

Figure 5:
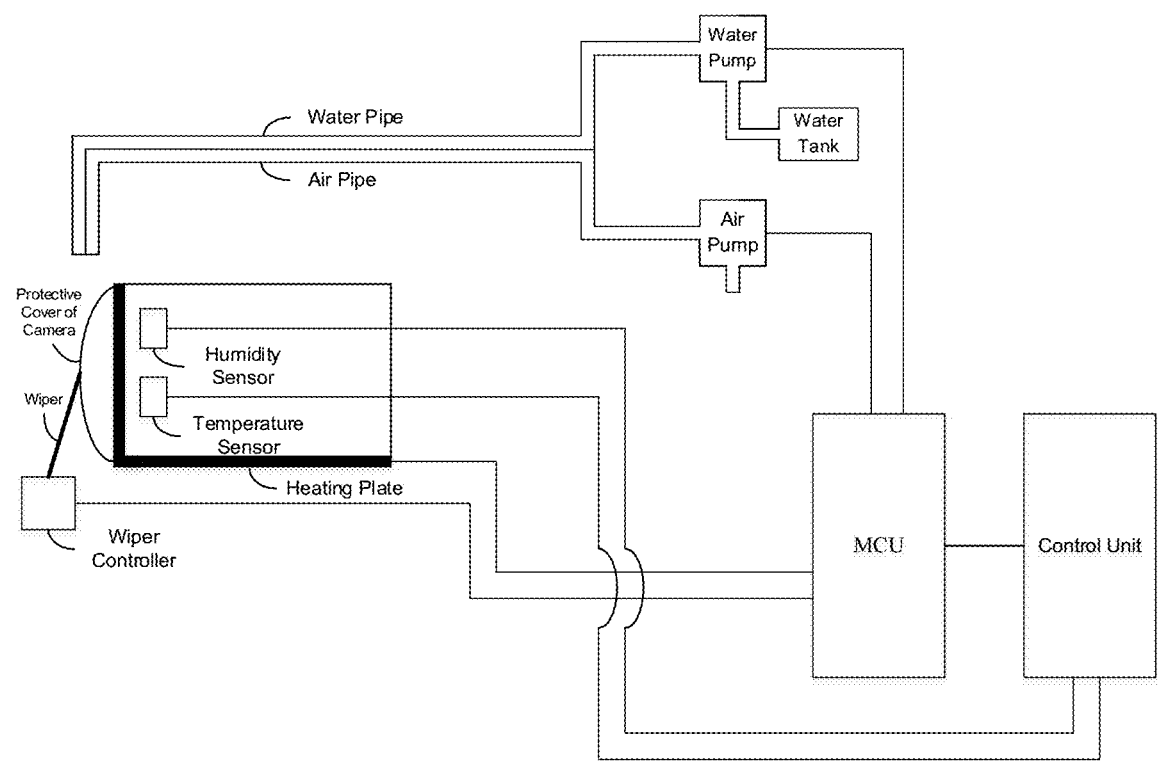
FIG. 5 is a fifth schematic diagram showing a structure of an automatic cleaning system according to an embodiment of the present disclosure.
Figure 6:
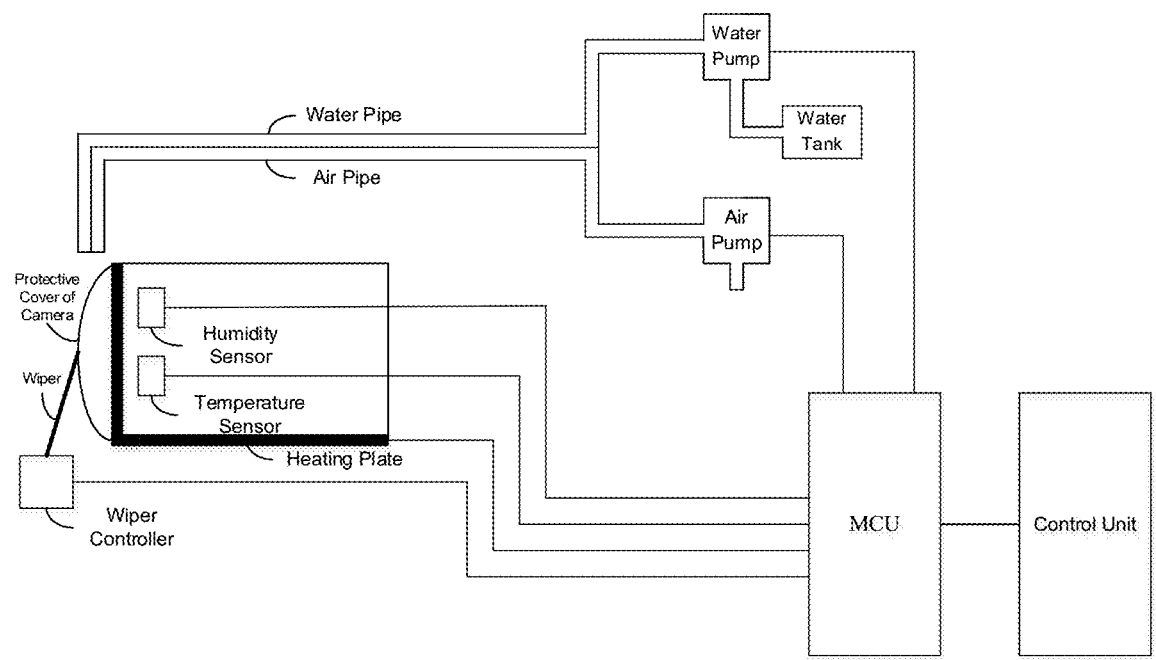
FIG. 6 is a sixth schematic diagram showing a structure of an automatic cleaning system according to an embodiment of the present disclosure.

Structure 2: The air blowing unit may include an air pump and an air pipe connected to an air outlet of the air pump. The water spraying unit may include a water pump, a water tank and a water pipe connected to a water outlet of the water pump. The nozzles of the air pipe and the water pipe may be both aimed at the outer side of the protective cover of the camera, as shown in FIGS. 5 and 6.

With Structure 2, the MCU 2 may control the air blowing unit in the cleaning device 3 to blow air towards the outer surface of the protective cover of the camera based on the air blowing information by: activating the air pump to blow air towards the outer surface of the protective cover of the camera via the air pipe. The operation of controlling the water spraying unit in the cleaning device 3 to spray water towards the surface of the protective cover of the camera based on the water spraying information may include: activating the water pump to pump water from the water tank and spray water towards the outer surface of the protective cover of the camera via the water pipe.

In some examples of Embodiment 1 of the present disclosure, the air blowing information may include information on an air blowing time length, and the water spraying information may include information on a water spraying time length.

As shown in FIGS. 3~6, the temperature sensor and the humidity sensor can be provided on the housing of the camera.

Embodiment 2

Figure 7:
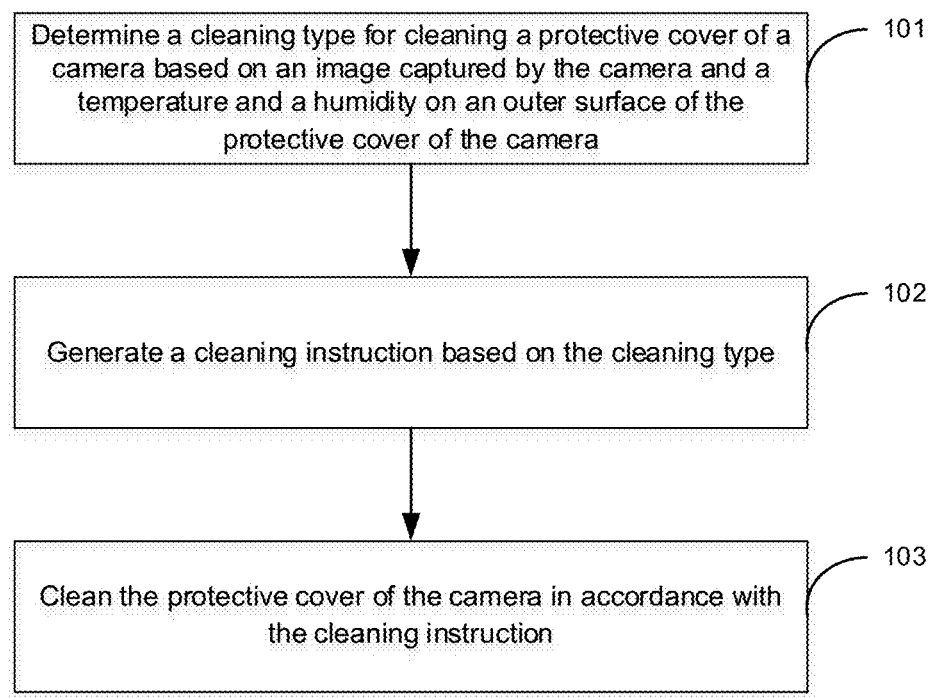
FIG. 7 is a flowchart illustrating an automatic cleaning method according to an embodiment of the present disclosure.

Based on the same concept as the above automatic cleaning system according to Embodiment 1, an automatic cleaning method is provided in Embodiment 2 of the present disclosure. The method is shown in FIG. 7 and includes the following steps.

At step 101, determining a cleaning type for cleaning a protective cover of a camera based on an image captured by a camera and a temperature and a humidity on an outer surface of the protective cover of the camera.

At step 102, generating a cleaning instruction based on the cleaning type.

In the embodiment of the present disclosure, a configuration table may be provided in advance and a correspondence between cleaning types and cleaning instructions may be set in the configuration table. After the cleaning type for cleaning the protective cover of the camera is determined in the step 101, the cleaning instruction corresponding to the cleaning type may be determined based on the correspondence in the step 102.

At step 103, cleaning the protective cover of the camera in accordance with the cleaning instruction.

In some examples of Embodiment 2, the above step 101 may include the following steps B1~B3.

At step B1, determining whether there is an obstruction outside the protective cover of the camera based on the image captured by the camera. If so, the operation proceeds with step B2; otherwise it proceeds with step B1.

At step B2, determining a type of the obstruction.

At step B3, determining the cleaning type for cleaning the protective cover of the camera based on the type of the obstruction and the temperature and the humidity on the outer surface of the protective cover of the camera.

The above step B1 of determining whether there is an obstruction outside the protective cover of the camera based on the image captured by the camera may include: inputting the image captured by the camera to a predetermined abnormality detection model to obtain characteristic information corresponding to the image; and determining whether there is an obstruction on the outer surface of the protective cover of the camera based on the characteristic information corresponding to the image. For the abnormality detection model, reference can be made to the above Embodiment 1 and details thereof will be omitted here.

The above step B2 may include: when the abnormality detection model determines that there is an obstruction outside the protective cover of the camera based on the image, inputting the image to a predetermined semantic segmentation model to determine the type of the obstruction. For the semantic segmentation model, reference can be made to the above Embodiment 1 and details thereof will be omitted here.

In some examples of Embodiment 2, the above step B3 may include: determining, when the type of the obstruction is solid substance, whether the temperature on the outer surface of the protective cover of the camera is lower than a predetermined temperature threshold (which may be set flexibly according to the actual situation, e.g., 5° or 0°), and if so, determining that the cleaning type is frozen solid, or otherwise determining that the cleaning type is non-frozen solid; or determining, when the type of the obstruction is liquid substance, whether the humidity on the outer surface of the protective cover of the camera is higher than a humidity threshold (which may be set flexibly according to the actual situation, e.g., 80%), and if so, determining that the cleaning type is non-viscous liquid, or otherwise determining that the cleaning type is viscous liquid.

In some examples of Embodiment 2, the above step 102 may include:

generating a first instruction including heating information and air blowing information when the cleaning type is frozen solid;

generating a second instruction including air blowing information when the cleaning type is non-frozen solid;

generating a third instruction including wiper activating information when the cleaning type is non-viscous liquid; or generating a fourth instruction including water spraying information and wiper activating information when the cleaning type is viscous liquid.

In some examples of Embodiment 2, the above step 103 may include:

controlling, in response to receiving the first instruction, a heating plate installed inside the protective cover of the camera to generate heat for a predetermined time length based on the heating information, and then controlling an air blowing unit in the cleaning device to blow air towards the outer surface of the protective cover of the camera based on the air blowing information;

controlling, in response to receiving the second instruction, the air blowing unit in the cleaning device to blow air towards the outer surface of the protective cover of the camera based on the air blowing information;

activating, in response to receiving the third instruction, a wiper in the cleaning device to wash the outer surface of the protective cover of the camera based on the wiper activating information; or controlling, in response to receiving the fourth instruction, a water spraying unit in the cleaning device to spray water towards the surface of the protective cover of the camera based on the water spraying information, and activating the wiper in the cleaning device to wash the outer surface of the protective cover of the camera based on the wiper activating information.

In some examples of Embodiment 2 of the present disclosure, the heating plate provided inside the protective cover of the camera may be a silicone electrical heating film, as the silicone electrical heating film is flexible and can be fully attached to the inner side of the protective cover of the camera so as to achieve a good heating effect. The silicone electrical heating film may have a thickness of 1.50 mm and its internal heating element may be a nickel chromium wire or metal foil.

In some examples of Embodiment 2 of the present disclosure, the air blowing information may include information on an air blowing time length, and the water spraying information may include information on a water spraying time length.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

What is claimed is:

1. An automatic cleaning method, comprising:
   determining a cleaning type for cleaning a protective cover of a camera;
   generating a cleaning instruction based on the cleaning type; and
   causing a cleaning of the protective cover of the camera in accordance with the cleaning instruction;
   wherein the determining the cleaning type comprises:
   in response to there being an obstruction outside the protective cover of the camera based on the image captured by the camera, determining a type of the obstruction;
   determining, in response to the type of the obstruction being liquid substance, whether a humidity on an outer surface of the protective cover of the camera is higher than a humidity threshold; and
   determining, in response to the humidity on the outer surface of the protective cover of the camera being higher than the humidity threshold, that the cleaning type is non-viscous liquid.

2. The method of claim 1, wherein the determining the cleaning type further comprises:
   determining, in response to the type of the obstruction being solid substance, whether a temperature on the outer surface of the protective cover of the camera is lower than the predetermined temperature threshold; and
   determining, in response to the temperature being lower than the predetermined temperature threshold, that the cleaning type is frozen solid.

3. The method of claim 2, wherein generating the cleaning instruction based on the cleaning type comprises:

generating a first instruction comprising heating information and air blowing information in response to the cleaning type being frozen solid.

4. The method of claim 3, wherein causing the cleaning of the protective cover of the camera in accordance with the cleaning instruction comprises:
controlling, in response to receiving the first instruction, a heating plate installed inside the protective cover of the camera to generate heat for a predetermined time length based on the heating information, and then blowing air towards the outer surface of the protective cover of the camera based on the air blowing information.

5. The method of claim 1, wherein the determining the cleaning type further comprises:
determining, in response to the type of the obstruction being solid substance, whether the temperature on the outer surface of the protective cover of the camera is not lower than a predetermined temperature threshold; and
determining, in response to the temperature being not lower than the predetermined temperature threshold, that the cleaning type is non-frozen solid.

6. The method of claim 5, wherein generating the cleaning instruction based on the cleaning type comprises:
generating a second instruction comprising air blowing information in response to the cleaning type being non-frozen solid.

7. The method of claim 6, wherein the causing the cleaning of the protective cover of the camera in accordance with the cleaning instruction comprises:
causing, in response to receiving the second instruction, blowing of air towards the outer surface of the protective cover of the camera based on the air blowing information.

8. The method of claim 1, wherein generating the cleaning instruction based on the cleaning type comprises:
generating a third instruction comprising wiper activating information in response to the cleaning type being non-viscous liquid.

9. The method of claim 8, wherein the causing the cleaning of the protective cover of the camera in accordance with the cleaning instruction comprises:
causing, in response to receiving the third instruction, activation of a wipe to wash the outer surface of the protective cover of the camera based on the wiper activating information.

10. The method of claim 1, wherein the determining the cleaning type further comprises:
determining, in response to the type of the obstruction being liquid substance, that the humidity on the outer surface of the protective cover of the camera is not higher than the humidity threshold; and
determining, in response to the humidity being not higher than the humidity threshold, that the cleaning type is viscous liquid.

11. The method of claim 10, wherein generating the cleaning instruction based on the cleaning type comprises:
generating a fourth instruction comprising water spraying information and wiper activating information in response to the cleaning type being the viscous liquid.

12. The method of claim 11, wherein the causing the cleaning of the protective cover of the camera in accordance with the cleaning instruction comprises:
causing, in response to receiving the fourth instruction, a spraying of water towards the surface of the protective cover of the camera based on the water spraying information, and activating the wiper to wash the outer surface of the protective cover of the camera based on the wiper activating information.

13. An automatic cleaning apparatus, comprising:
a processor configured to:
determine a cleaning type for cleaning a protective cover of a camera;
generate a cleaning instruction based on the cleaning type; and
cause a cleaning of the protective cover of the camera in accordance with the cleaning instruction;
wherein the processor is further configured to:
in response to there being an obstruction outside the protective cover of the camera based on an image captured by a camera, determining a type of the obstruction;
determine, in response to the type of the obstruction being liquid substance, whether a humidity on an outer surface of the protective cover of the camera is higher than a humidity threshold; and
determine, in response to the humidity on the outer surface of the protective cover of the camera being higher than the humidity threshold, that the cleaning type is non-viscous liquid.

14. The automatic cleaning apparatus of claim 13, wherein the processor is further configured to:
determine, in response to the type of the obstruction being solid substance, whether a temperature on the outer surface of the protective cover of the camera is lower than a predetermined temperature threshold; and
determine, in response to the temperature being lower than the predetermined temperature threshold, that the cleaning type is frozen solid.

15. The automatic cleaning apparatus of claim 13, wherein the processor is further configured to:
determine, in response to the type of the obstruction being solid substance, whether the temperature on the outer surface of the protective cover of the camera is not lower than a predetermined temperature threshold; and
determine, in response to the temperature being not lower than the predetermined temperature threshold, that the cleaning type is non-frozen solid.

16. The automatic cleaning apparatus of claim 13, wherein the processor is further configured to:
determine, in response to the type of the obstruction being liquid substance, whether the humidity on the outer surface of the protective cover of the camera is not higher than the humidity threshold; and
determine, in response to the humidity being not higher than the humidity threshold, that the cleaning type is viscous liquid.

17. The automatic cleaning apparatus of claim 15, wherein the processor is further configured to:
generate a second instruction comprising air blowing information in response to the cleaning type being the non-frozen solid.

18. The automatic cleaning apparatus of claim 13, wherein the processor is further configured to:
generate a third instruction comprising wiper activating information in response to the cleaning type being the non-viscous liquid.

19. The automatic cleaning apparatus of claim 16, wherein the processor is further configured to:
generate a fourth instruction comprising water spraying information and wiper activating information in response to the cleaning type being the viscous liquid.

20. A computer readable storage medium having a computer program stored thereon, wherein the computer program is executed by a processor to perform a cleaning method comprising:
- determining a cleaning type for cleaning a protective cover of a camera;
- generating a cleaning instruction based on the cleaning type; and
- causing a cleaning of the protective cover of the camera in accordance with the cleaning instruction;
- wherein the determining the cleaning type comprises:
- in response to there being an obstruction outside the protective cover of the camera based on an image captured by a camera, determining a type of the obstruction;
- determining, in response to the type of the obstruction being liquid substance, whether a humidity on an outer surface of the protective cover of the camera is higher than a humidity threshold; and
- determining, in response to the humidity on the outer surface of the protective cover of the camera being higher than the humidity threshold, that the cleaning type is non-viscous liquid.

* * * * *